US012810638B1

(12) United States Patent
Hernon

(10) Patent No.: US 12,810,638 B1
(45) Date of Patent: Nov. 24, 2026

(54) MULTI-OBSERVER BATCH CAMOUFLAGE EFFECTIVENESS EVALUATION SYSTEM AND METHOD

(71) Applicant: James Gary Hernon, Spring Hill, FL (US)

(72) Inventor: James Gary Hernon, Spring Hill, FL (US)

( * ) Notice: Subject to any disclaimer, the term of this patent is extended or adjusted under 35 U.S.C. 154(b) by 0 days.

(21) Appl. No.: 19/650,429

(22) Filed: Apr. 17, 2026

(51) Int. Cl.
*G06V 20/70* (2022.01)
*G06F 16/53* (2019.01)

(52) U.S. Cl.
CPC .............. *G06V 20/70* (2022.01); *G06F 16/53* (2019.01)

(58) Field of Classification Search
None
See application file for complete search history.

(56) References Cited

U.S. PATENT DOCUMENTS 12,148,069 B2 * 11/2024 Hernon ................... G06T 11/10
2026/0099982 A1 * 4/2026 Thompson, Jr. ........ G06T 15/04

FOREIGN PATENT DOCUMENTS

CN 111126514 A * 5/2020 ........... G06F 18/214
CN 116630620 A * 8/2023 ............. G06V 10/26
KR 20190109291 A * 9/2019 ........... H04N 19/136
WO WO-2023148285 A1 * 8/2023 ............. G06V 20/70

OTHER PUBLICATIONS

H. Lamdouar, W. Xie and A. Zisserman, "The Making and Breaking of Camouflage," 2023 IEEE/CVF International Conference on Computer Vision (ICCV), Paris, France, 2023, pp. 832-842, doi: 10.1109/ICCV51070.2023.00083. (Year: 2023).*

Zhou Wang, A. C. Bovik, H. R. Sheikh and E. P. Simoncelli, "Image quality assessment: from error visibility to structural similarity," in IEEE Transactions on Image Processing, vol. 13, No. 4, pp. 600-612, Apr. 2004, doi: 10.1109/TIP.2003.819861. (Year: 2004).*

Daneshvar, E., Tehrani M., and Zeighami F., "Multi-Dimensional Analytical Base for Evaluating Camouflage Patters"; Journal of Textiles and Polymers; vol. 9, No. 3, Jul. 2021, pp. 21-27. (Year: 2021).*

* cited by examiner

*Primary Examiner* — David Ometz

(57) ABSTRACT

A computer-implemented system and method to evaluate camouflage effectiveness across combinatorial sets of pattern images and background images under multiple observer vision models. A pre-computation engine transforms each unique image once per observer model to generate reusable cached arrays, reducing total processing from a combinatorial scale to a linear scale relative to input sets. A deduplication manager queries a persistent database using composite identifiers to avoid re-computation and enable incremental evaluation across sessions. A parallel execution engine distributes new evaluation tasks across processor cores to compute Model A and Model B effectiveness scores and a differential metric. Retrieved and newly computed results are combined into a consolidated multi-sheet report that presents per-observer comparisons and aggregate rankings. The system enables efficient, scalable, and repeatable multi-observer camouflage analysis across large image sets.

20 Claims, 6 Drawing Sheets

Dashed border = system boundary 100
Arrows = data/control flow

Dashed border = system boundary 100
Arrows = data/control flow

Delta (A−B): positive = greater concealment under Model A
negative = greater concealment under Model B

FIG. 6

Consolidated report workbook 120 · 600

SHEET 1 LEGEND 602

SHEET 2 SUMMARY 604

SHEET 3 FULL RESULTS 606

SHEET 4 RANKINGS 608

SHEET 3- FULL RESULTS (Column Structure Shown) 606

| Pattern 622 | Background 624 | Observer 610 | Score_Ref 612 | Score_Obs 614 | Delta (Ref-OBS) 616 | Source 618 |
|---|---|---|---|---|---|---|
| pattern_01 | woods_2 | Observer Model A | 4/7 | 5/7 | -1 | dedup. |
| pattern_01 | woods_2 | Observer Model B | 4/7 | 6/7 | -2 | dedup. |
| pattern_01 | woods_2 | Observer Model C | 4/7 | 5/7 | -1 | new |
| pattern_01 | woods_2 | Observer Model D | 4/7 | 6/7 | -2 | dedup. |
| pattern_01 | woods_2 | Observer Model E | 4/7 | 5/7 | -1 | dedup. |
| pattern_02 | woods_3 | Observer Model A | 4/7 | 6/7 | -2 | dedup. |
| pattern_02 | woods_3 | Observer Model B | 4/7 | 6/7 | -2 | dedup. |
| pattern_02 | woods_3 | Observer Model C | 4/7 | 6/7 | -2 | new |
| pattern_02 | woods_3 | Observer Model D | 4/7 | 6/7 | -2 | dedup. |
| pattern_02 | woods_3 | Observer Model E | 4/7 | 5/7 | -1 | dedup. |

N x M x S rows total

Per Observer Score Column Group 620
(One Score_Model_B + One Delta per Observer)

SHEET 4- PATTERN RANKINGS (aggregate per pattern) 608
One row per pattern · mean Score_Model_A
mean Score_Model_B · mean Delta (A-B) · pass rates
per-factor pass %
Multi-Observer: one mean Score_Model_B column +
one Delta column per observer vision model 620

MULTI-OBSERVER BATCH CAMOUFLAGE EFFECTIVENESS EVALUATION SYSTEM AND METHOD

TECHNICAL FIELD

The present invention relates generally to computer-implemented image analysis systems, and more particularly to batch evaluation frameworks for computing camouflage effectiveness scores across complete combinatorial sets of camouflage pattern images and environmental background images, simultaneously under multiple observer vision models, using pre-computed image transforms to eliminate redundant computation across evaluation pairs. The system supports evaluation across multiple observer models, including biological and non-biological perception systems.

BACKGROUND OF THE INVENTION

Camouflage effectiveness evaluation requires assessing how well a given camouflage pattern conceals a subject when deployed in a specific environment, as perceived by a specific observer. A single evaluation produces a concealment score for one pattern-background-observer combination. In practice, however, camouflage developers, procurement evaluators, and researchers require assessment across large combinatorial spaces: a manufacturer with twenty distinct camouflage patterns and fifty representative background environments must evaluate one thousand pattern-background combinations to characterize complete portfolio performance.

When evaluation must additionally account for multiple observer models-including biological and non-biological perception systems such as human vision, dichromatic ungulate vision as possessed by white-tailed deer and elk, and tetrachromatic avian vision as possessed by wild turkey and waterfowl, the naive combinatorial scale becomes P times B times S, where P is the number of patterns, B is the number of backgrounds, and S is the number of observer models. For twenty patterns, fifty backgrounds, and four observers, the naive approach requires four thousand individual evaluation operations, each involving a full image transform through an observer-specific lookup table. This computational burden makes comprehensive multi-observer evaluation impractical using existing single-pair evaluation tools.

A further limitation of existing approaches is the absence of persistent result storage with deduplication logic. When evaluation runs are interrupted, repeated, or extended across sessions, previously computed pattern-background-observer combinations are re-evaluated unnecessarily, wasting computational resources and producing duplicate records. There is no mechanism in existing systems to identify previously evaluated combinations and retrieve their stored results rather than recomputing them.

A further limitation is the absence of coordinated multi-observer execution. Existing tools evaluate camouflage effectiveness against a single observer model per run. Evaluating the same pattern-background grid against multiple observers requires separate sequential runs, with no consolidated output and no cross-observer comparative metrics in a unified report.

Accordingly, there exists a need for a batch evaluation system that computes camouflage effectiveness scores across the complete combinatorial space of a pattern set and background set, simultaneously under multiple observer vision models, using a pre-computation architecture that eliminates redundant image transforms, with persistent deduplication preventing re-evaluation of previously scored combinations, and producing consolidated reports enabling cross-observer performance comparison.

Certain camouflage pattern generation techniques, including techniques disclosed in U.S. Pat. No. 12,148,069 B2 assigned to the present inventor, enable creation of visually complex camouflage designs. However, such techniques do not provide scalable, multi-dimensional evaluation architectures for assessing performance across large combinatorial input spaces.

The system described herein is compatible with quantitative evaluation outputs generated by external image analysis systems. Such systems may compute effectiveness scores based on visual representations under various observer models. The present invention is directed to execution architecture and computational optimization independent of any specific scoring methodology.

The observer vision models applied by the pre-computation engine employ the data-driven simulation architecture described in co-pending U.S. patent application Ser. No. 19/643,132, and the neutral-preserving RGB cone projection methodology described in co-pending U.S. patent application Ser. No. 19/643,275.

BRIEF SUMMARY OF THE INVENTION

The present invention provides a computer-implemented multi-observer batch camouflage effectiveness evaluation system 100 and method. The system 100 accepts as input a pattern image set 114 comprising a plurality of camouflage pattern images, a background image set 116 comprising a plurality of environmental background images, and an observer group configuration 118 specifying two or more observer vision models. The system 100 produces as output a consolidated report workbook 120 presenting a complete N times M times S matrix of quantitative camouflage effectiveness scores, and maintains a persistent evaluation database 112 accumulating results across sessions.

In one aspect, a pre-computation engine 104 loads each unique image once and applies each observer vision model lookup table once per unique image, producing cached image arrays reused across all evaluation pairs involving that image, such that total transform operations equal (N plus M) times S rather than N times M times S required by naive per-pair evaluation.

In preferred implementations, one of the observer vision models comprises a human vision model serving as a reference baseline for comparative evaluation.

In another aspect, a parallel evaluation engine 106 dispatches pair evaluation tasks across available processor cores using a process-based parallel execution pool, enabling concurrent scoring across the complete task set.

In another aspect, a deduplication manager 108 queries the evaluation database 112 before each evaluation task using a composite key comprising pattern image identity 504, background image identity 506, and observer vision model identifier 508, routing previously evaluated combinations to a retrieval path 514 rather than recomputing them.

In another aspect, a report generator 110 produces a consolidated report workbook 120 presenting scores for all evaluated and retrieved combinations with per-observer-model score columns grouped as per-observer score column group 620, enabling direct cross-observer performance comparison.

BRIEF DESCRIPTION OF THE DRAWINGS

FIG. 6 illustrates the structure of a consolidated report workbook including multiple sheets for legend, summary, detailed results, and pattern rankings, with multi-observer comparison columns.

DETAILED DESCRIPTION OF THE INVENTION

Figure 1:
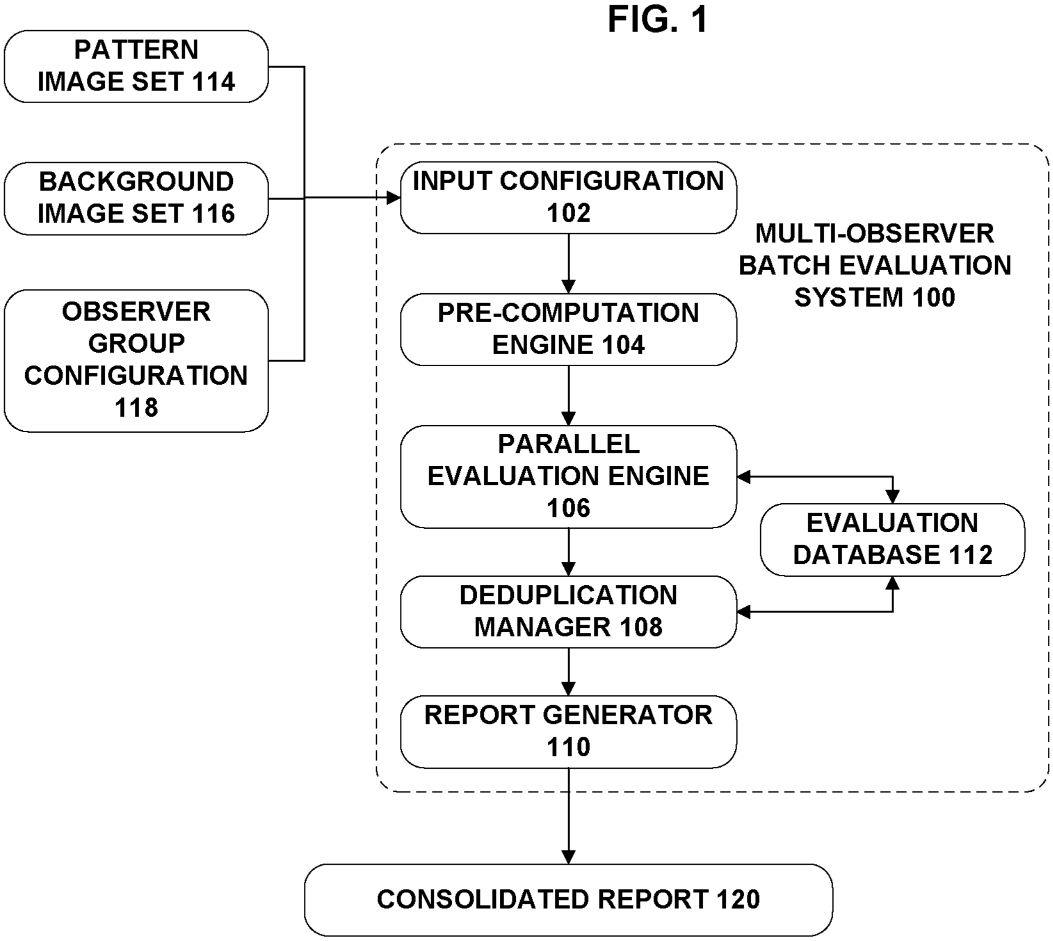
FIG. 1 illustrates a system architecture for a multi-observer batch camouflage effectiveness evaluation platform, showing system components, data inputs, processing modules, storage, and report output, along with data flow relationships.

Referring to FIG. 1, the multi-observer batch camouflage effectiveness evaluation system 100 comprises six primary components: an input configuration module 102, a pre-computation engine 104, a parallel evaluation engine 106, a deduplication manager 108, a report generator 110, and an evaluation database 112. These components operate on a pattern image set 114 and a background image set 116, under direction of an observer group configuration 118, to produce a consolidated report workbook 120 and an updated evaluation database 112.

The pattern image set 114 comprises one or more digital raster images depicting camouflage patterns. Supported formats include JPEG, PNG, BMP, TIFF, and WebP, as well as camera RAW formats processed through a full-decode pipeline. The background image set 116 comprises one or more digital raster images depicting environmental scenes against which camouflage concealment is to be evaluated. Images in both sets are referenced by file path identifiers that serve as stable keys for database indexing and deduplication.

The observer group configuration 118 specifies two or more observer vision models against which the complete pattern-background grid is to be evaluated. Each observer vision model corresponds to a pre-generated lookup table encoding the visual transformation characteristics of the observer. In preferred embodiments, the observer group configuration supports both predefined group presets and user-defined custom groups assembled from a validated observer profile library.

In various embodiments, the observer vision models are not limited to biological vision systems. Observer models may include biological, machine-based, or sensor-based perception systems, including but not limited to human vision, non-human vision, computer vision systems, autonomous detection systems, infrared or multispectral sensing systems, and remote sensing platforms. The system operates independently of the underlying observer model implementation and evaluates visual representations corresponding to such observer models.

In many practical applications, a human vision model serves as a reference observer against which one or more additional observer models are compared, enabling assessment of differences in detectability or concealment effectiveness between human perception and target observer perception. While the system supports comparison between any two or more observer models, use of a human vision model as a reference baseline provides a consistent frame of reference for evaluating observer-specific variation.

Predefined observer group presets include a hunting group comprising white-tailed deer, black bear, wild hog, and elk; a waterfowl group comprising mallard duck, Canada goose, and wood duck; a predator group comprising coyote, red fox, and bobcat; and a raptor group comprising red-tailed hawk, great horned owl, and bald eagle. Observer vision models within a group are not required to share the same vision type; the raptor group includes both tetrachromatic species (red-tailed hawk, bald eagle) and the great horned owl, which is dichromatic. Custom groups may be assembled from any combination of validated observer profiles in the library, subject to a minimum of two observer vision models. Selected group configurations are persisted to application settings for reuse across evaluation sessions.

The evaluation database 112 is a persistent structured storage substrate, in preferred embodiments implemented as a SQLite database operating in write-ahead logging mode to support concurrent read access during active evaluation runs. The evaluation database 112 stores evaluation records indexed by the combination of pattern image identity 504, background image identity 506, and observer vision model identifier 508. The evaluation database 112 is referenced by the deduplication manager 108 to identify previously evaluated combinations and is updated with new evaluation results as they are produced. The database schema and storage implementation are not claimed as part of the present invention; the evaluation database 112 serves as a persistence substrate for the deduplication and retrieval functions that are claimed.

Figure 2:
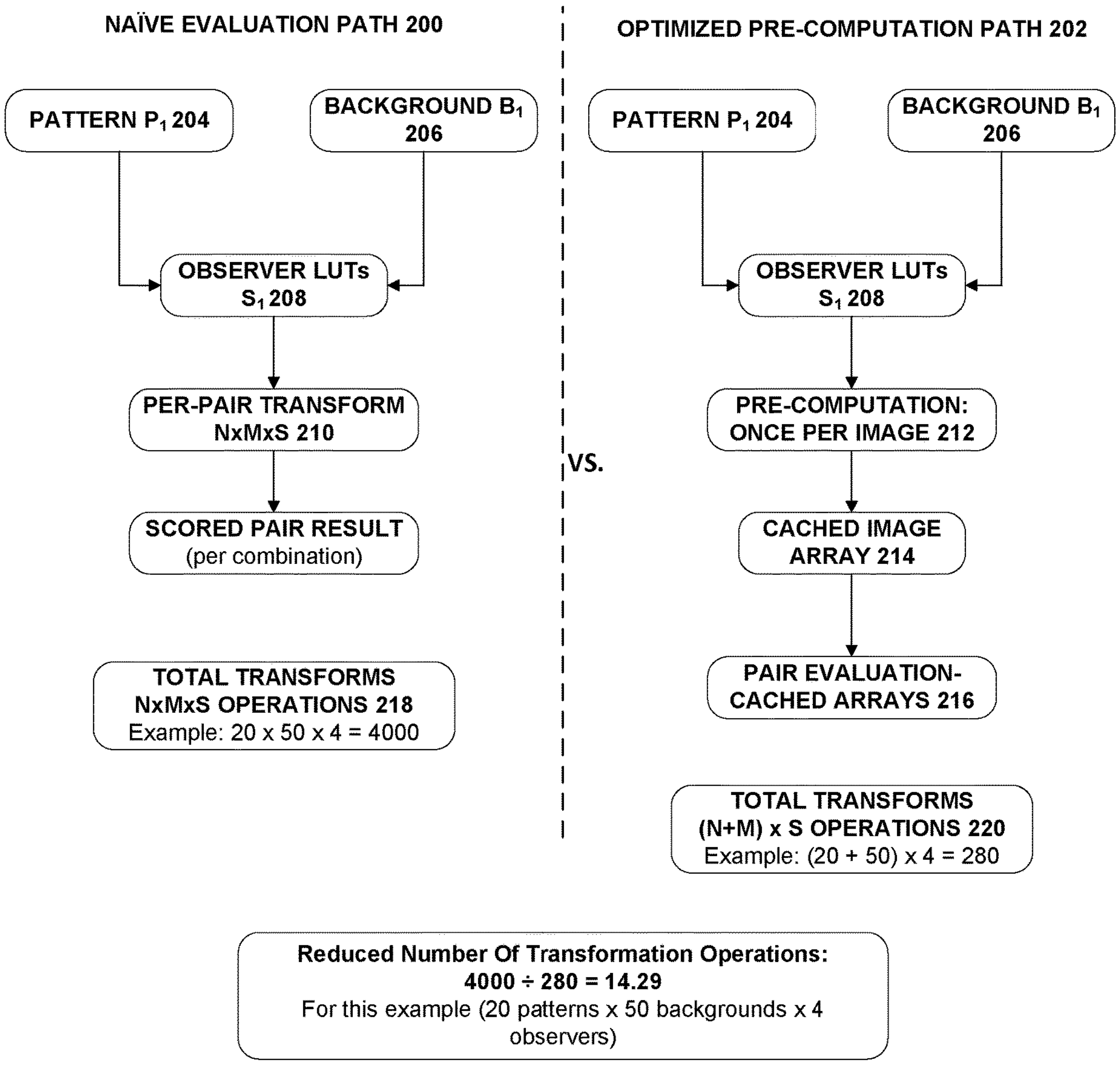
FIG. 2 illustrates a comparison between a naïve per-pair evaluation approach and an optimized pre-computation approach, demonstrating reduction in total image transform operations through reuse of cached transformed images.

Referring to FIG. 2, the pre-computation engine 104 implements a transform reduction architecture that eliminates redundant image processing operations across the evaluation matrix. The naive evaluation path (200) and the optimized pre-computation path (202) are shown side by side for comparison. In both paths, the inputs are a pattern image (204), a background image (206), and observer lookup tables (208). The naive evaluation path (200) requires a per-pair transform operation (210) for each pattern-background-observer combination. For a pattern image set 114 of N images, a background image set 116 of M images, and an observer group configuration 118 of S observer vision models, the naive evaluation path (200) requires N times M times S transform operations as indicated at total transform count (218).

The pre-computation engine 104 of the optimized pre-computation path (202) eliminates this redundancy by recognizing that each unique image will be evaluated against every image in the opposing set and therefore requires only one transform per observer vision model regardless of how many pairs involve that image. Before the pair evaluation loop begins, the pre-computation engine 104 iterates over every unique image in the pattern image set 114 and background image set 116, loads each image once, downsamples each image to analysis resolution, and applies each observer vision model lookup table in the observer group configuration 118 via pre-computation transform operation (212) to produce a cached image array (214) per image per observer vision model. The cached image arrays (214) are referenced by identity key throughout the evaluation run, and pair evaluation (216) operates entirely on cached image arrays (214).

For a pattern image set 114 of N images, a background image set 116 of M images, and an observer group configuration 118 of S observer vision models, the pre-computation engine 104 requires (N plus M) times S transform operations as indicated at total transform count (220). For an exemplary evaluation of twenty patterns against fifty backgrounds under four observer vision models, the pre-computation engine 104 performs 280 transform operations compared to 4,000 operations under the naive evaluation path (200), a reduction factor of approximately 14.29. The reduction factor increases with evaluation scale; for fifty patterns against one hundred backgrounds under four observer vision models, the reduction factor exceeds 33.

In preferred embodiments, down-sampling to analysis resolution occurs during pre-computation rather than per-pair, providing an additional performance benefit. Each image is down-sampled once regardless of the number of evaluation pairs in which it participates.

Figure 3:
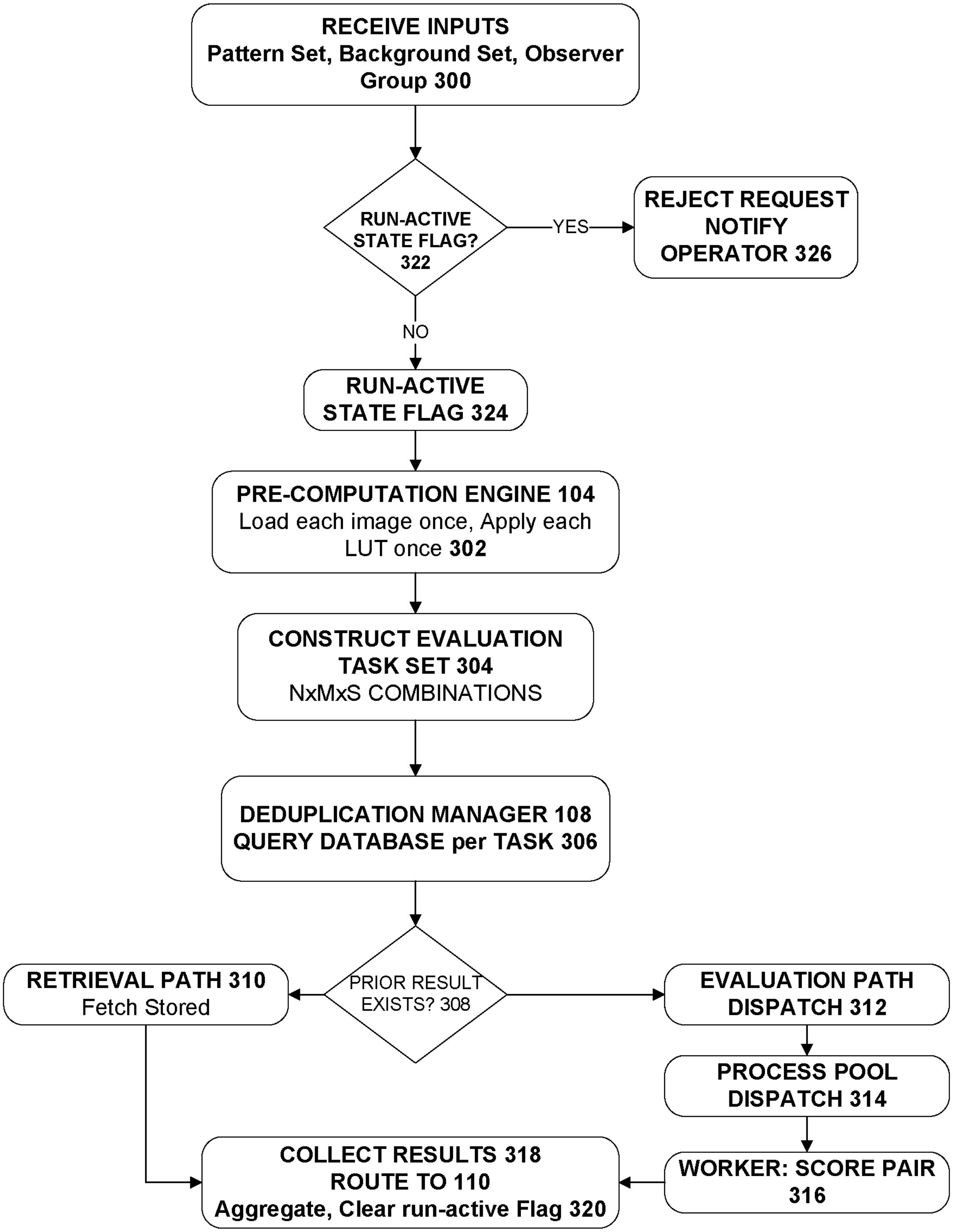
FIG. 3 illustrates a workflow for multi-observer batch evaluation, including input handling, pre-computation, task construction, deduplication checks, parallel processing, and result aggregation.

Referring to FIG. 3, at step 300 the system receives the pattern image set 114, background image set 116, and observer group configuration 118. Before initiating evaluation, the re-entry guard check 322 queries the run-active state flag 324. If the run-active state flag 324 is set, the evaluation request is rejected and the operator is notified 326. If the run-active state flag 324 is not set, the flag (324) is set to active and evaluation execution proceeds.

At step 302 the pre-computation engine 104 is invoked, producing cached image arrays 214 for all images and all observer vision models in the observer group configuration 118 as described above with reference to FIG. 2. At step 304 the complete evaluation task set is constructed, comprising all N times M times S combinations of the pattern image set 114, background image set 116, and observer group configuration 118. At step 306 the deduplication manager 108 is invoked to query the evaluation database 112 for each task, as described below with reference to FIG. 5. Decision step 308 routes each task: tasks for which prior results exist are routed to retrieval path 310; remaining tasks are routed to evaluation path 312.

At step 314, tasks on the evaluation path 312 are dispatched to the process pool. The parallel evaluation engine 106 employs a process-based parallel execution pool rather than a thread-based pool, bypassing interpreter-level concurrency limitations that would otherwise serialize compute-intensive image analysis operations. Each worker process at step 316 receives the pre-computed cached image arrays 214 for its assigned pattern-background pair and the observer vision model identifier 508, computes the effectiveness scores as described below with reference to FIG. 4, and returns the scored result to the coordinating process. In preferred embodiments, each worker process in the process pool is initialized via a process initializer function that instantiates per-worker evaluation objects, such that per-worker instantiation occurs once per worker process at pool creation rather than once per evaluation task, amortizing instantiation cost across all tasks assigned to the worker.

At step 318 results from both the retrieval path 310 and the evaluation path 312 are collected. At step 320 results are aggregated and routed to the report generator 110, and the run-active state flag 324 is cleared. Clearing the run-active state flag 324 on completion, cancellation, or error termination ensures that subsequent evaluation runs may be initiated without requiring application restart.

In preferred embodiments, the evaluation pipeline executes on a dedicated worker thread separate from the application user interface thread, enabling user interface responsiveness during evaluation runs. Worker thread communication with the user interface occurs through thread-safe signal and slot mechanisms.

Figure 4:
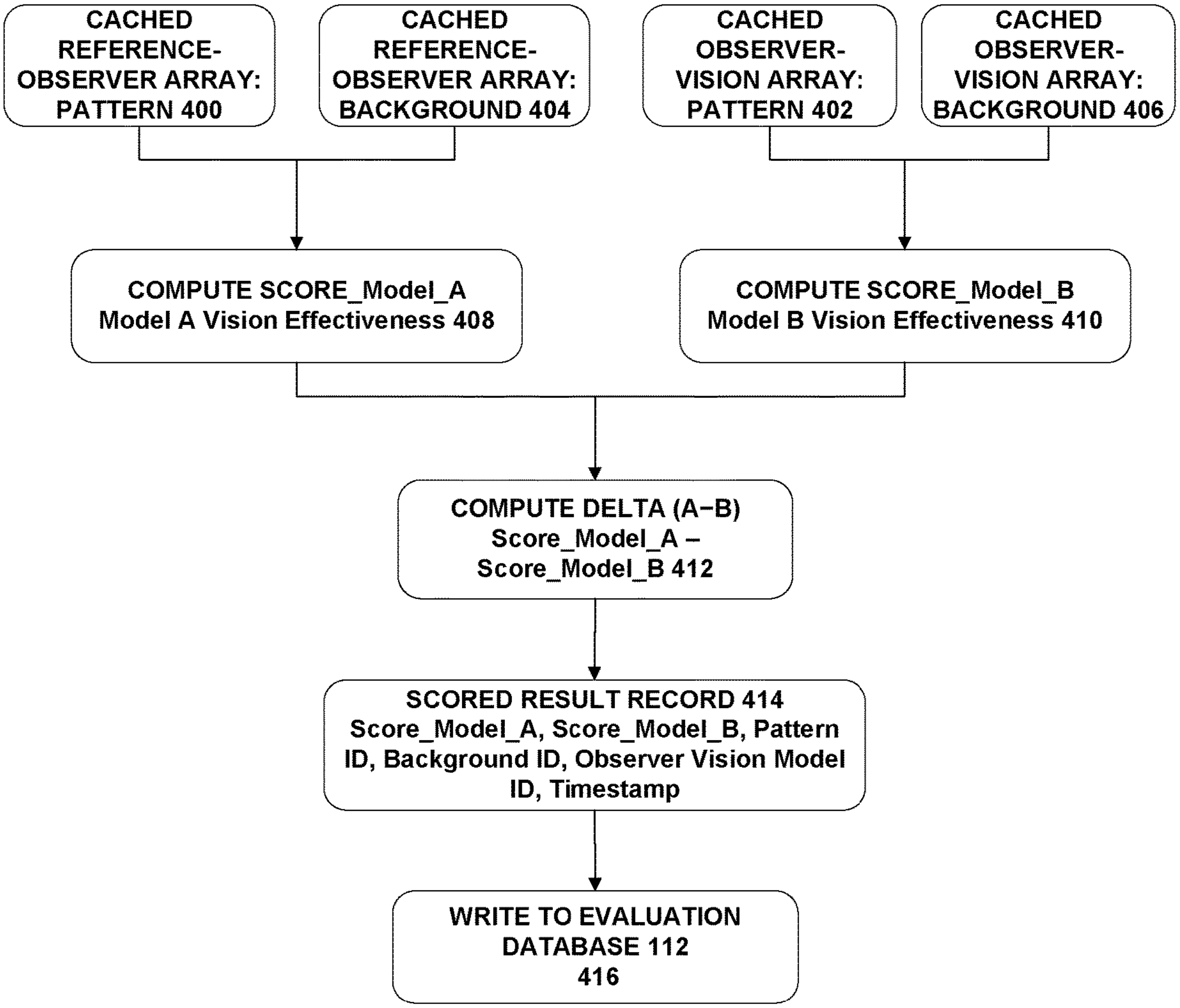
FIG. 4 illustrates a per-pair scoring pipeline showing computation of reference observer effectiveness and observer-model effectiveness, and a differential metric between them, followed by result storage.

Referring to FIG. 4, for each evaluation task on the evaluation path 312, the per-pair scoring pipeline receives four cached image arrays: cached reference-observer array for the pattern 400, cached observer-vision array for the pattern 402, cached reference-observer array for the background 404, and cached observer-vision array for the background 406.

At step 408, Score_Model_A is computed by applying a multi-factor camouflage effectiveness methodology to the cached reference-observer arrays 400 and 404. At step 410, Score_Model_B is computed by applying the same methodology to the cached observer-vision arrays 402 and 406 transformed through the observer vision model lookup table for the assigned observer vision model identifier 508. The specific multi-factor scoring methodology applied to produce Score_Model_A and Score_Model_B is described in co-pending related application Ser. No. 19/452,589 and is not re-claimed herein.

In preferred embodiments, the human vision model serves as a reference observer model for computation of differential metrics relative to one or more additional observer models. However, the system is not limited to human-referenced comparisons and supports computation of differential metrics between any selected observer models.

At step 412, Delta (A-B) is computed as Score_Model_A minus Score_Model B. A positive Delta (A-B) value indicates that the pattern provides greater concealment under Model A than under the assigned observer vision model, signifying that the pattern exploits visual perception characteristics present in Model A but not in the target observer. A negative Delta (A-B) value indicates greater concealment effectiveness under Model B than under Model A. A Delta (A-B) value near zero indicates consistent effectiveness across both observer types.

At step 414, a scored result record is assembled comprising Score_Model_A, Score_Model_B, Delta (A-B), pattern image identity 504, background image identity 506, observer vision model identifier 508, scoring timestamp, and processing duration. At step 416, the scored result record is written to the evaluation database 112 for persistence, subject to the deduplication logic described below with reference to FIG. 5.

Figure 5:
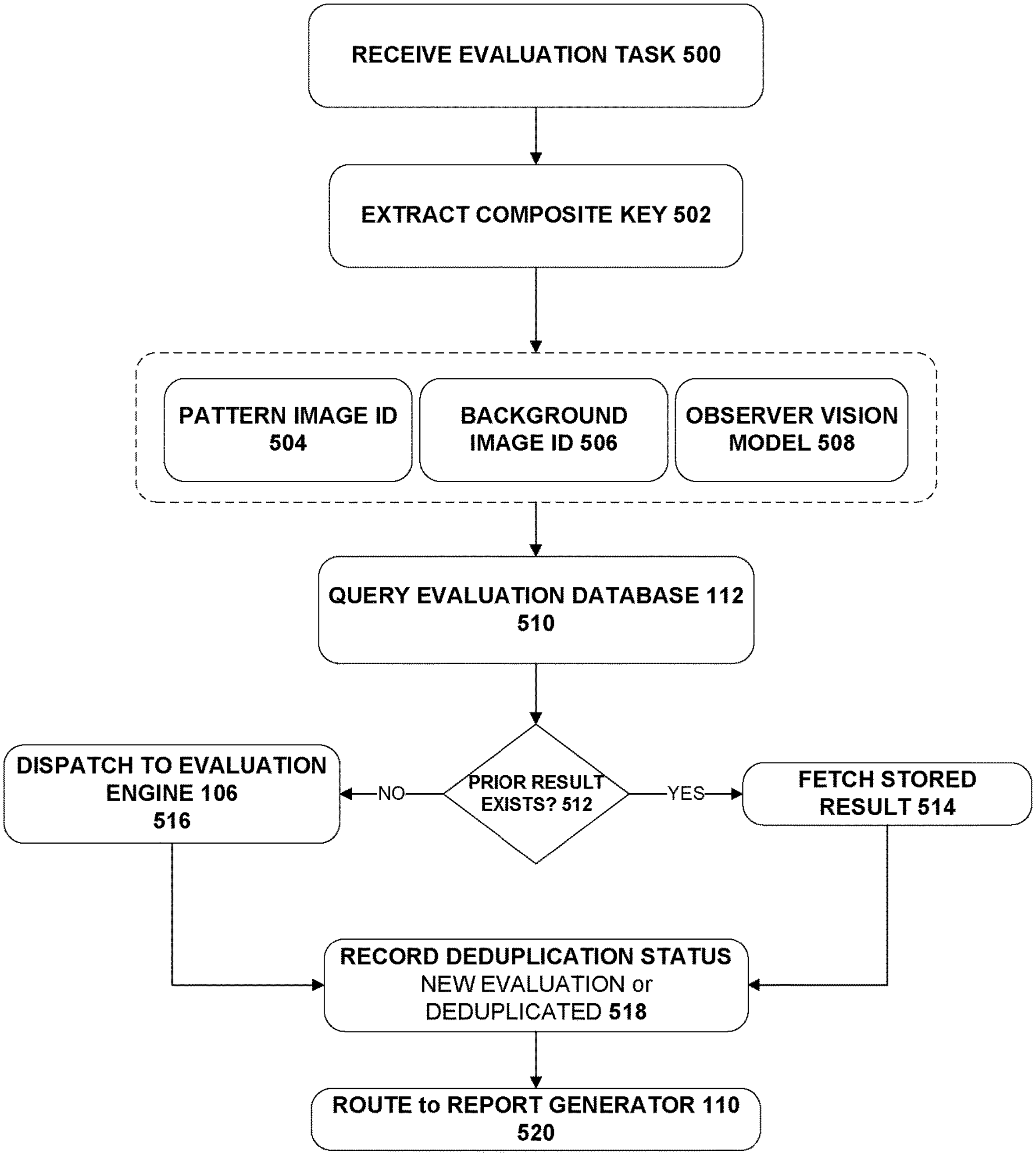
FIG. 5 illustrates a deduplication decision process in which evaluation tasks are checked against a database and routed either to computation or retrieval paths.

Referring to FIG. 5, at step 500 an evaluation task is received by the deduplication manager 108. At step 502, the composite key is extracted comprising pattern image identity 504, background image identity 506, and observer vision model identifier 508. Image identity is determined from the file path of each image, providing a stable key consistent across evaluation sessions on the same file system.

At step 510, the evaluation database 112 is queried using the composite key. At decision step 512, one of two routing decisions is made. If no prior result exists in the evaluation database 112 for the composite key, the task is routed to the evaluation path 516: pre-computed cached image arrays 214 are dispatched to the parallel evaluation engine 106, scores are computed as described above with reference to FIG. 5, and the scored result record is written to the evaluation database 112. If a prior result exists in the evaluation database 112 for the composite key, the task is routed to the retrieval path 514: the stored result is read from the evaluation database 112 without re-evaluation.

At step 518, deduplication status is recorded for the pair, identifying it as either a new evaluation or a deduplicated retrieval. At step 520, the result is routed to the report generator 110. Deduplicated pairs are included in the consolidated report workbook 120 with their stored scores and are identified by deduplication status column 618 in the Full Results sheet 606.

The deduplication architecture enables incremental evaluation. An operator who has previously evaluated twenty patterns against fifty backgrounds may add ten additional patterns to the pattern image set 114 and re-run the evaluation. The deduplication manager 108 routes the one thousand previously evaluated combinations to the retrieval path 514 and routes the five hundred new combinations to the evaluation path 516, producing a complete consolidated report workbook 120 covering all thirty patterns without redundant computation.

Referring to FIG. 6, the report generator 110 produces the consolidated report workbook 120, represented as workbook 600, upon completion of each evaluation run. The workbook 600 is organized as four sheets.

The Legend sheet 602 provides column definitions, factor descriptions, score range explanations, and color coding keys. Observer vision model identifiers 508 evaluated in the run are substituted throughout the legend for clarity, enabling the report to serve as a self-contained reference.

The Summary sheet 604 presents run-level metadata and aggregate statistics including pattern image set 114 path, background image set 116 path, observer group configuration 118 identifier, evaluation date and time, total pair count, new evaluation count, and deduplicated pair count. Aggregate statistics include mean Score_Model_A, mean Score_Model_B, mean Delta (A-B), pass rates, and top-ranked patterns by mean Delta (A-B).

The Full Results sheet 606 presents one row per evaluated pair. Column structure includes pattern identity column 622, background identity column 624, observer vision model identifier column 610, Score_Model_A column 612, Score_Model_B column 614, Delta (A-B) column 616, deduplication status column 618, all individual factor scores for both vision types, timing, and error fields. In multi-observer-model runs, the observer vision model identifier column 610 identifies the observer model applied to each row, enabling all observer results for a given pattern-background combination to appear as adjacent rows for direct comparison.

The Pattern Rankings sheet 608 presents one row per unique pattern image with aggregate statistics computed across all evaluated backgrounds. Statistics include mean Score_Model_A, mean Score_Model_B, mean Delta (A-B), pass rates, and per-factor pass percentages for both vision types, sorted by mean Delta (A-B) in descending order. In multi-observer-model runs, the Pattern Rankings sheet 608 includes the per-observer score column group 620 comprising one mean Score_Model_B column and one Delta (A-B) column per observer vision model evaluated, enabling direct cross-observer performance comparison within a single workbook.

In preferred embodiments, the system presents a run confirmation interface prior to initiating an evaluation run. The run confirmation interface performs a folder scan of the pattern image set 114 and background image set 116 directories, enumerates available images, computes total pair count as the product of pattern count, background count, and observer count from the observer group configuration 118, and queries the evaluation database 112 to identify the subset of combinations for which prior results exist. The interface displays to the operator the new evaluation count, deduplicated pair count, and total pair count before evaluation begins.

The run confirmation interface additionally presents an estimated run time computed from a persisted evaluation rate parameter. The evaluation rate parameter records the processing throughput of the most recently completed evaluation run in pairs per second and is stored in application settings between sessions. The estimated run time is computed as the new evaluation count divided by the persisted evaluation rate. This self-calibrating mechanism ensures that estimated run times reflect current system performance rather than fixed nominal values, accounting for variation in pattern complexity, background resolution, and available processor resources.

The invention claimed is:

1. A computer-implemented method for processing digital image data for multi-model combinatorial evaluation using cached transformed image representations, comprising:

receiving a plurality of first images, a plurality of second images, and a plurality of observer models, each observer model defining a transformation of visual representation;

pre-computing, for each unique image across evaluation combinations formed from the plurality of first images, second images, and observer models, a set of transformed image representations by applying each observer model transformation once per unique image, thereby generating reusable cached image arrays;

constructing a combinatorial evaluation set comprising combinations of a first image, a second image, and an observer model;

for each combination, querying a persistent data store using a composite key comprising identifiers of the first image, second image, and observer model to determine whether a prior result exists;

for combinations lacking a prior result, computing one or more evaluation scores using the cached image arrays corresponding to the first image and second image under the observer model;

for combinations having a prior result, retrieving the prior result without recomputation;

executing computations for combinations lacking prior results in parallel across multiple processing units;

aggregating computed and retrieved results into a consolidated output structure;

wherein total transformation operations are reduced from a per-combination execution model to a per-image execution model through reuse of the cached image arrays across evaluation combinations; and wherein the composite key uniquely identifies a prior evaluation result across multiple evaluation sessions.

2. A computer-implemented system for multi-dimensional image evaluation, comprising:

a pre-computation engine configured to:

identify unique images across a plurality of input image sets; and generate, for each unique image, transformed representations for each observer model;

a task construction module configured to generate a combinatorial evaluation matrix comprising combinations of images and observer models;

a deduplication manager configured to:

generate a composite key comprising identifiers of images and observer models; and query a persistent data store to determine existence of prior evaluation results;

an evaluation engine configured to compute evaluation scores using pre-computed transformed representations;

a retrieval engine configured to retrieve stored evaluation results for combinations having prior results;

a parallel execution framework configured to distribute evaluation computations across multiple processing units;

a reporting module configured to aggregate evaluation results into a structured output;

wherein each transformed image representation is reused across multiple distinct evaluation combinations involving the corresponding image, thereby reducing total transformation operations from a per-combination execution model to a per-image execution model.

3. The method of claim 1, wherein the observer models are defined by lookup tables mapping input image values to transformed representations.

4. The method of claim 1, wherein the method further comprises computing a differential metric representing a difference between evaluation scores generated under a reference observer model and a selected observer model, wherein the differential metric quantifies variation in detectability or concealment effectiveness across observer models.

5. The method of claim 1, wherein the persistent data store supports incremental evaluation by preventing recomputation of previously evaluated combinations across multiple evaluation sessions.

6. The method of claim 1, wherein the consolidated output comprises a multi-dimensional dataset including:

identifiers of input images, observer model identifiers, computed evaluation scores, and deduplication status indicators.

7. The method of claim 1, wherein the first images comprise camouflage patterns and the second images comprise environmental backgrounds.

8. The method of claim 1, wherein observer models are organized into configurable groups.

9. A non-transitory computer-readable medium storing instructions that, when executed, cause a processor to perform the method of claim 1.

10. The method of claim 1, wherein one of the observer models is designated as a reference baseline for computing differential metrics relative to one or more remaining observer models, without requiring a fixed or predefined reference model.

11. The method of claim 1, wherein the pre-computing step reduces total observer model transformation operations from P times B times S operations under a per-combination execution model to (P plus B) times S operations, where P is the number of first images, B is the number of second images, and S is the number of observer models, such that for an evaluation set comprising twenty first images, fifty second images, and four observer models the total transformation operations are reduced from four thousand to two hundred eighty, representing a reduction factor of approximately fourteen times, and wherein the reduction factor increases with the scale of P and B independently of S.

12. The method of claim 1, wherein the observer models include at least one of:

biological vision models, machine vision models, sensor-based detection models, multispectral or hyperspectral perception models, or combinations thereof.

13. The system of claim 2, wherein the system includes a run-state control mechanism configured to prevent concurrent execution of evaluation runs.

14. The system of claim 2, wherein the system estimates execution time based on previously recorded processing throughput.

15. The system of claim 2, wherein evaluation tasks are executed using process-based parallelism.

16. The system of claim 2, wherein the parallel execution framework comprises a process pool in which each worker process is initialized via a process initializer function that instantiates per-worker evaluation objects, such that per-worker object instantiation occurs once per worker process at pool creation rather than once per evaluation task.

17. The system of claim 2, wherein the persistent data store is implemented as a structured local database operating in write-ahead logging mode to support concurrent read access during active evaluation runs.

18. A method for reducing redundant transformation operations across a combinatorial image evaluation space, comprising:

receiving a set of input items and a set of transformation models, wherein the input items are images and each transformation model defines a mapping of image pixel values to transformed representations;

identifying unique input items participating in a plurality of evaluation combinations, each combination comprising at least one input item and at least one transformation model;

applying each transformation model to each unique input item once to generate a cached transformed representation, independent of the number of evaluation combinations in which that input item participates;

storing each cached transformed representation for reuse across all evaluation combinations involving the corresponding input item and transformation model;

executing evaluation combinations using the cached transformed representations in place of repeated application of the transformation models; and wherein the transformation models are observer vision model lookup tables mapping input digital image pixel values to perceptually transformed pixel values, wherein the cached transformed representations are stored in memory as image arrays indexed by image identifier and observer model identifier, wherein evaluation combinations are scored using a quantitative effectiveness methodology applied to the cached image arrays, and wherein total transformation operations scale with the number of unique input items multiplied by the number of transformation models, rather than with the number of evaluation combinations, thereby reducing computational complexity from a combinatorial scale to a linear scale relative to the input sets.

19. The method of claim 18, wherein total transformation operations equal the product of the number of unique input items and the number of transformation models, rather than the product of the number of evaluation combinations and the number of transformation models required under a per-combination execution model, such that the reduction in transformation operations is independently verifiable by comparing operation counts under both execution models.

20. A non-transitory computer-readable medium storing instructions that, when executed, cause a processor to perform the method of claim 18.

* * * * *